United States Patent [19]

Seipos

[11] 4,255,914
[45] Mar. 17, 1981

[54] CLIP FOR SECURING PLANAR MEMBERS

[75] Inventor: Andrew G. Seipos, Miami, Fla.

[73] Assignee: Automated Building Components, Inc., Miami, Fla.

[21] Appl. No.: 953,760

[22] Filed: Oct. 23, 1978

[51] Int. Cl.³ .......................... E04B 2/58; E04B 1/38
[52] U.S. Cl. ........................................ 52/483; 52/509; 52/714; 411/477
[58] Field of Search .............. 85/11; 24/73 B; 52/714, 52/520, 509, 489, 483, 774, 546

[56] References Cited

U.S. PATENT DOCUMENTS

| | | | |
|---|---|---|---|
| 2,317,428 | 4/1943 | Anderson | 52/714 X |
| 2,814,840 | 12/1957 | Sears | 52/714 X |
| 3,331,180 | 7/1967 | Vissing et al. | 52/714 |
| 3,393,488 | 7/1968 | Schneller | 52/714 X |
| 3,828,514 | 8/1974 | Jwiert | 52/714 X |

FOREIGN PATENT DOCUMENTS 46-15574 4/1971 Japan ............................ 85/11

Primary Examiner—Alfred C. Perham
Attorney, Agent, or Firm—LeBlanc, Nolan, Shur & Nies

[57] ABSTRACT

A clip for securing planar members, such as tongue and groove pine boards, panel boards and flooring, to wooden supports, such as furring strips. The clip is formed from a metal plate and has first and second portions struck out from the plate. The first and second portions both extend outwardly from the plate in the same direction. The first portion is angularly bent so as to form an L-shaped finger member capable of engaging a peripheral edge of the planar member to be secured to the furring strip. The second portion has a free pointed end and is angularly bent so that it can be driven back across the plane in which the plate lies and then driven into the wooden support member to which the planar member is to be secured.

10 Claims, 5 Drawing Figures

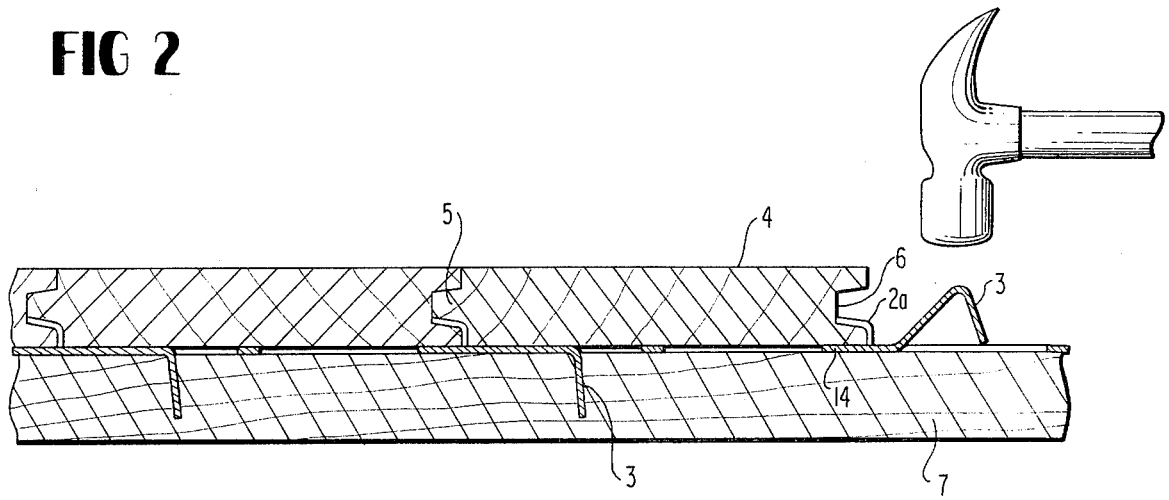
FIG 2
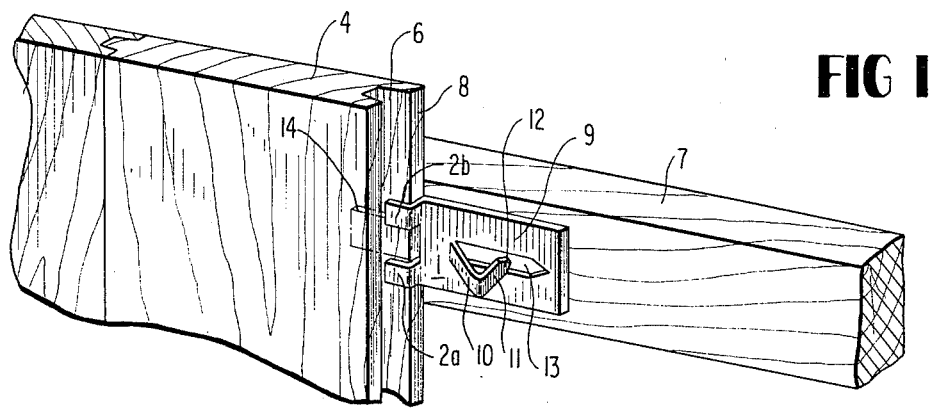
FIG 1
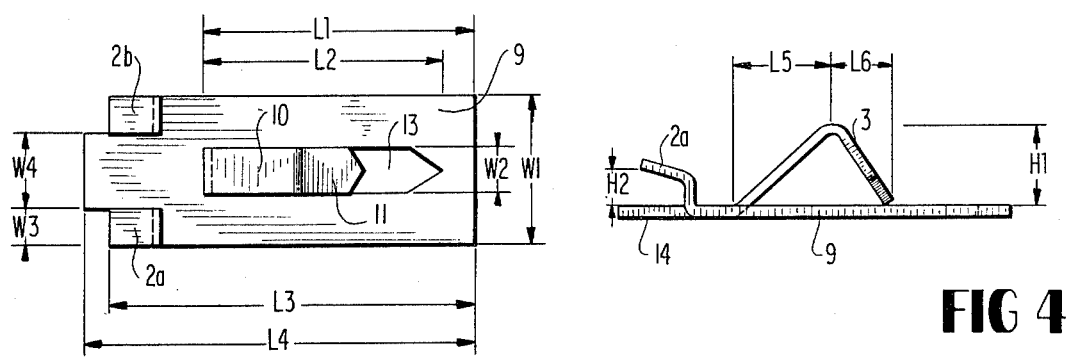
FIG 3
FIG 4
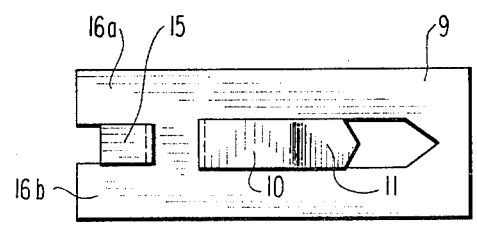
FIG 5

CLIP FOR SECURING PLANAR MEMBERS

BACKGROUND OF THE INVENTION

The present invention relates to fasteners for securing planar members to wooden strips. In particular, the types of planar members of primary concern are tongue and groove panelling, wall or flooring members such as pine boards.

In accordance with prior art techniques, when tongue and groove members are to be secured to elongated wooden support strips, the sheets are typically interlocked one at a time with nails then being toed into the rear edge of the grooved portion so as to secure the planar member to the support strip. The support strips can be either thin furring strips or larger support members. The alternative to such a technique is to drive the nails through the outer face of the planar members for securing them to the support strip. In the latter case, even when finishing nails are used, an undesirable appearance is created. With the prior technique, damage is often caused to the grooved portion as the nail is driven into place. Such damage is especially frequent when the amateur carpenter, which is the category into which most homeowners fall, attempts to use a toe nailing procedure for securing the tongue and groove planar members.

Various different types of fasteners are known within the prior art for securing planar members to a support structure. Several examples of such clips and fasteners are illustrated in the following U.S. Pat. Nos. 3,713,264 to Morgan; 3,828,514 to Jureit; 3,922,764 to Downing; and 4,000,596 to Magill. None of these patents, however, disclose a fastener that overcomes the above mentioned problems.

SUMMARY OF THE INVENTION

An object of the present invention is to provide a fastener that readily enables planar members to be secured to wooden support members while minimizing any potential damage to the planar members.

Another object of the present invention is to provide a fastener for securing tongue and groove planar members to wooden support members, which fastener is not visible after the planar members are so secured and also helps to eliminate the possibility of damage to the planar members at the time that they are secured to the support strips.

A further object of the present invention is to provide a fastener for securing tongue and groove planar members to support strips that can be readily and easily utilized by amateur carpenters, such as homeowners doing their own home improvement projects.

Still another object of the present invention is to provide a procedure for securing planar member to support member that can be easily carried out by amateur carpenters so that such carpenters can construct professional appearing walls and floors in that adjacent planar members are in even edge to edge contact and engagement so that gaps or cracks between such adjacent members are avoided.

A still further object of the present invention is to provide a fastener for securing planar members to wooden support members, which fasteners can be easily and inexpensively manufactured.

These objectives are achieved by the utilization of a clip made in accordance with the present invention. The clip is formed from a metal plate and has a first finger-like member that extends from the plate and serves to secure a peripheral edge of the planar member that is to be secured to the elongated wooden strip. A second extended portion of the plate is angularly bent and has a point at its free end so as to form a V-shaped nail. This second portion extends outwardly from the plate in the same direction as the finger that grips the planar member. After the finger member is positioned so as to engage the peripheral edge of the planar member, the second portion of the clip is driven back across the plane of the metal plate and into the wooden support strip.

The finger member of the clip is formed by striking out a portion of the plate and angularly bending that portion so as to form a generally L-shaped finger member. The portion of the plate adjacent to the area from which the finger was struck out serves as a backing member that is positioned behind the rear face of the planar member that is to be secured. Thus, the planar member is clamped between the finger member and the backing member when engaged by the clip.

While the finger member is referred to as generally L-shaped, in the preferred embodiment of the present invention, the finger should be slightly slanted or angled in an upward direction toward the outermost end of the plate. This angle of inclination can be between 10° and 30° from the horizontal plane of the plate from which the finger is struck out. This slant or upward angulation of the finger allows for a given clip to accommodate planar members of slightly varying dimensions. These fingers are still able to fit over the edges of the planar members even if the edges are slightly thicker than their designated thickness.

The finger member, the backing member and the nail portion of the clip all extend in parallel directions along the longitudinal axis of the metal plate that forms the clip. In addition, the edge of the finger member that is attached to the plate lie back to back. Thus, after the clip is pressed against the edge of the planar member, when the nail is hammered into the wooden strip, a force is created along the longitudinal axis of the plate in a direction towards the finger member, thereby further forcing the finger member and the backing member into engagement with the planar member.

In the preferred embodiment of the present invention, it is desirable that the end of the plate in which the finger and backing are to be formed be separated into three portions by providing two longitudinally extending slits. The two outer portions of this section of the plate can be angularly bent to form the L-shaped finger members and the center portion forms the backing member. Alternatively, the center portion can be angularly bent to form the L-shaped finger member with the outer two portions then serving as the backing members.

The clips of the present invention is an unitary structure formed from a single metal plate. The clip, therefore, can be fabricated from sheet metal using inexpensive punch and die techniques. Since the clip can be inexpensively manufactured, the cost to the user is relatively low.

BRIEF DESCRIPTION OF THE DRAWINGS

FIG. 1 is a fragmentary perspective view of a planar member being secured to an elongated wooden strip by a clip in accordance with the present invention.

FIG. 2 is a fragmentary side elevational view of a plurality of planar members being secured to an elongated wooden strip by clips such as that found in FIG. 1.

FIG. 3 is a top plan view of the clip illustrated in FIG. 1.

FIG. 4 is a side elevational view of the clip illustrated in FIG. 1.

FIG. 5 is a top plan view of another embodiment of a clip in accordance with the present invention.

DESCRIPTION OF THE PREFERRED EMBODIMENTS

As illustrated in FIG. 1, a clip 1 is used for securing a tongue and groove planar member 4 to a wooden strip 7. Clip 1 has two spaced fingers 2a and 2b that are separated by a backing member 14. Fingers 2a and 2b are struck out from the metal plate 9 that forms clip 1. Fingers 2a and 2b are first bent upwardly and then angularly bent outwardly so as to have approximately an L-shape. Fingers 2a and 2b should be sufficiently spaced above backing number 14 so as to be capable of engaging lower portion 8 of groove section 6 of planar member 4. In order to ensure that fingers 2a and 2b can properly engage portion 8, the fingers are slanted or angled in an upward direction toward the outermost ends. This slant or upward angulation of the fingers permits a given clip to accommodate planar members of slightly varying dimensions and still have the fingers fit over lower portions 8 of varying thickness. When the clip engages lower portion 8 of the planar member, the planar member is in effect clamped between fingers 2a and 2b and backing member 14.

A second portion struck out from the metal plate is a tooth or nail 3. Nail 3 is struck out from the plate 9 so as to provide a shank portion 10 and a tip portion 11. Shank 10 and tip 11 are angularly related in such a manner that the tip is poised for insertion through opening 13 that is left in plate 9 when nail 3 is struck out. Nail 3 is preferably provided with a shallow V-shaped cross section throughout its full length for reinforcement purposes. Nail 3 is struck such that it extends towards the opposite end of the plate from the fingers.

In utilizing clip 1, fingers 2a and 2b and backing member 14 are inserted over lower position 8 of the panel member and extends along the longitudinal axis of furring strip 7. After the clip is firmly pushed into place, tip 11 of nail 3 is hammered through opening 13 in metal plate 9 and into furring strip 7. As the nail is hammered into place, a force is created towards fingers 2a and 2b thereby further pushing the fingers and the backing member into engagement with lower portion 8 of planar member 4. This moves the planar member into snug contact with the previously erected planar member so as to avoid any crack between the edges of planar members. It will be understood that the interaction of the metal clips and wooden planar members is such that a force of the type created by the particular configuration of the nail 3 is sufficient to depress or deform the back edges of the planar members to the extent necessary to ensure a tight edge to edge engagement of such planar members.

After nail 3 has been hammered into place such as shown in FIG. 2, another planar member is placed over the furring strip with tongue 5 of the next planar member being inserted into groove 6 of the prior planar member. The procedure is then repeated with the new planar member being secured to the furring strip with the use of additional clips.

As shown in FIGS. 3 and 4, in accordance with one embodiment of the present invention, the two outer sections of one end of metal plate 9 are bent upwardly from the plate and then angularly bent so as to form L-shaped fingers 2a and 2b. In an alternative embodiment, shown in FIG. 5, it is possible for a center section 15 of the metal plate to be bent upwardly and then angularly bent in an L shape so as to form a finger for gripping the lower portion of the planar member. In this embodiment, the outer portions 16a and 16b of the metal plate form backing members which engage the rear face of planar member 4.

In the specific embodiment of the present invention illustrated in the drawings, the clip is used for securing tongue and groove pine boards to wooden support strips. Such boards are typically ½" thick and 4" wide. The clip for securing such boards normally would be formed of 20 or 22 gauge galvanized mild steel and have the following illustrative dimensions: the length of the metal plate, L4, is 1⅝"; the length from the rear edge of the fingers to the front edge of the clip, L3, is 1¼"; the length from the edge of shank 10 attached to the metal plate to the front of the clip, L1, is 1⅛"; and the length of opening 13, L2, is 1".

Turning to the widths of the various portions of the clip, it can be seen from FIG. 3 that the width of each finger 2a and 2b is one-half the width of backing member 14. In the particular embodiment illustrated W3 is 5/32" and W4 is 5/16". The entire width of the clip, W1, is ⅝". The width of nail 3 is 3/16" or approximately ⅓ of the entire width. As shown, the shank of the nail is longer than the tip. Hence, although shank 10 and tip 11 form approximately a right angle and shank 10 is arranged at approximately a 45° angle to metal plate 9, length L5 is greater than length L6. In the illustrated clip, L5 is 13/32" and L6 is 7/32".

The bent portion of nail 3 is substantially higher than the height of the fingers. In the embodiment of FIGS. 3 and 4, H1 is ⅜". The height of the finger, H2, while less than height H1, should be slightly larger than 3/16", which is the approximate thickness of portion 8, to allow for sufficient leeway for the finger to fit over portion 8 of the pine board. To further facilitate this engagement, the end of fingers 2a and 2b both form approximately a 15° angle with the plane of the metal plate.

Thus it will be seen that the arrangement of the present invention provides a clip for securing tongue and groove planar members to wooden support strips wherein the clip is hidden after the planar members are secured and helps to eliminate the possibility of damage to the planar members at the time that they are secured to the support strips. The fastener and fastening arrangement may be readily and easily utilized by amateur carpenters, such as homeowners doing their own home improvement projects.

The clip is so constructed as to insure that even such amateur carpenters may achieve professional appearing walls and floors wherein adjacent planar members are in even edge to edge contact and engagement thereby avoiding gaps or cracks between such adjacent members. The unique clips utilized for this purpose are unitary and formed from sheet metal that can be fabricated by the use of inexpensive punch and die techniques thereby making the fasteners available at low cost. However, while the fastener and arrangement of this invention is such as to make it particularly susceptible of use by amateur carpenters, the fastener and assembly method are such as to make the same also advantageous to use by skilled carpenters as well as in prefabrication systems.

The invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A structural joint comprising: a wooden support member; a first planar member to be secured to said wooden support member and having a grooved section extending along one edge thereof; a clip securing said first planar member to said wooden support members, said clip being formed by a metal plate having struck out therefrom a first portion extending outwardly from one face of said plate and being angularly bent so as to form a generally L-shaped gripping member, said first portion being arranged in engagement with a lower portion of said grooved section of said first planar member, said L-shaped gripping member having a first leg attached to said plate and extending approximately perpendicularly to said plate and a second leg connected to said first leg and extending at an angle of approximately 15° to the plane of said plate; and said metal plate further having struck out therefrom a second portion initially extending outwardly from the same face of said plate as said first portion and in a direction substantially parallel with but opposite to said first portion, said second portion having a free pointed end and initially being angularly bent such that said pointed end points toward a plane in which said metal plate lies and said point end being driven into said wooden support member; a second planar member having a tongue section protruding along one peripheral edge thereof, said tongue section being inserted into said grooved section of said first planar member so that the outer planar surfaces of said first and second planar members are substantially coplanar; and the length of the section of said metal plate from which said second portion is struck out being approximately ⅔ of the length of said metal plate and the width of said second portion being approximately ⅓ of the width of said metal plate.

2. A method for securing planar members to wooden support members, where each of the planar members has tongue and groove portions extending along two opposing edges thereof, by using a fastener formed from a metal plate having struck out therefrom a first portion extending outwardly from one face of the plate and being angularly bent so as to form a generally L-shaped gripping member for engaging a portion of the lower edge of the grooved section of a planar member and the metal plate also having struck out therefrom a second portion extending outwardly from the same face of the plate as the first portion and extending in a direction substantially parallel with but opposite to the first portion, said L-shaped gripping member having a first leg attached to said plate and extending approximately perpendicularly to said plate and a second leg connected to said first leg and extending at an angle of approximately 15° to the plane of said plate, the second portion forming a prong having a free pointed end and being angularly bent such that the pointed end points toward a plane in which the metal plate lies, and the length of the section of said metal plate from which said second portion is struck out being approximately ⅔ of the length of said metal plate and the width of said second portion being approximately ⅓ of the width of said metal plate, the method comprising the steps of: placing a first planar member over the wood support member to which the planar member is to be secured; arranging at least one fastener along the lower edge of the grooved section of the planar member such that the first portion grips the upper surface of such lower edge and the second portion of the fastener is positioned over a wooden support member; driving the pointed end of the second portion of the fastener into the wooden support member so as to secure the fastener and the planar member to the wooden support member and such driving action forces the first portion of the plate into tighter engagement with the planar member; inserting a tongue section of another planar member into the grooved section of the secured planar member thereby clamping the first portion of the fastener used to secure the prior planar member between the top of the lower edge of the grooved section of such prior planar member and the bottom of the tongue section of the next planar member; and securing this next planar member to an appropriate wooden support member by using at least one of the fasteners in the same manner as the prior planar member was secured.

3. A clip for securing planar members to support members, said clip comprising: a metal plate having struck out therefrom a first portion extending outwardly from one face of said plate and being angularly bent so as to form a generally L-shaped gripping member for engaging a portion of a peripheral edge of a planar member, said L-shaped gripping member having a first leg attached to said plate and extending approximately perpendicularly to said plate and a second leg connected to said first leg and extending at an angle of approximately 15° to the plane of said plate; and said metal plate further having struck out therefrom a second portion extending outwardly from the same face of said plate as said first portion, said second portion forming a prong having a free pointed end and being angularly bent such that said pointed end points toward a plane in which said metal plate lies, said prong being capable of being driven into a support member so as to secure said clip along with a planar member gripped by said first portion of said metal plate to such support member; both said first portion and said second portion extending in substantially parallel opposing directions; and the length of the section of said metal plate from which said second portion is struck out being approximately ⅔ of the length of said metal plate and the width of said second portion being approximately ⅓ of the width of said metal plate.

4. A clip according to claim 1 wherein said metal plate has a third portion lying in the plane of said metal plate and extending adjacent to first portion, said third portion serving to engage a planar member along its rear face so that such planar member is clamped between said first portion and said third portion.

5. A clip according to claim 4 wherein said first portion and said second portion are each formed by sections struck out from said metal plate and each of said sections is only attached to said metal plate along one edge of said respective section.

6. A clip according to claim 4 wherein said first and second portions are struck out from said metal plate such that only one edge of each of said portions is connected to said metal plate with both of said edges being aligned in a spaced back-to-back relationship.

7. A clip according to claim 4 wherein said metal plate has a fourth portion extending outwardly from said plate in the same direction as said first portion and being angularly bent so as to form another gripping member for engaging a portion of a peripheral edge of a planar member and said first and fourth portions extending parallel to each other and lie on opposite sides of said third portion so as to form a spaced pair of gripping members.

8. A clip for securing planar members to wooden support members, where each of the planar members has tongue and groove portions extending along two opposing edges thereof, said clip comprising: a metal plate having struck out therefrom a first portion extending outwardly from one face of said plate and angularly bent so as to form an L-shaped gripping member for engaging a planar member within its grooved portion, said first portion being angularly bent so as to be generally L-shaped, said L-shaped gripping member having a first leg attached to said plate and extending approximately perpendicularly to said plate and a second leg connected to said first leg and extending at an angle of approximately 15° to the plane of said plate; and said metal plate further having struck out therefrom a second portion extending outwardly from the same face of said metal plate as said first portion and extending in a direction substantially parallel with but opposite to said first portion, and said second portion forming a prong having a free pointed end and being angularly bent so as to be capable of being driven into a wooden support member to which the planar member is to be secured; and the length of the section of said metal plate from which said second portion is struck out being approximately ⅔ of the length of said metal plate and the width of said second portion being approximately ⅓ of the width of said metal plate.

9. A clip according to claim 8 wherein both said first portion and said second portion are attached to said plate only along one edge of said respective section and the free end of each of said first and second portions extend in opposite directions along the longitudinal axis of said metal plate.

10. A clip according to claim 9 wherein said metal plate has a third portion lying in the plane of said metal plate and extending adjacent to first portion, said third portion serving to engage a planar member along its rear face so that such planar member is clamped between said first portion and said third portion.

* * * * *